United States Patent
Tomita et al.

(10) Patent No.: US 7,617,046 B2
(45) Date of Patent: *Nov. 10, 2009

(54) NAVIGATION APPARATUSES, METHODS, AND PROGRAMS

(75) Inventors: Hiroshi Tomita, Okazaki (JP); Hiroki Ishikawa, Okazaki (JP)

(73) Assignee: Aisin AW Co., Ltd., Anjo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/314,744

(22) Filed: Dec. 16, 2008

(65) Prior Publication Data

US 2009/0105938 A1    Apr. 23, 2009

Related U.S. Application Data

(63) Continuation of application No. 11/176,250, filed on Jul. 8, 2005, now Pat. No. 7,483,788.

(30) Foreign Application Priority Data

Jul. 9, 2004    (JP) .............................. 2004-203746

(51) Int. Cl.
    *G01C 21/30* (2006.01)
(52) U.S. Cl. ................ 701/210; 701/200; 701/202; 701/209; 701/25; 701/66; 340/995.13; 340/995.23
(58) Field of Classification Search .................. 701/25, 701/35, 66, 200, 202, 206, 207, 209, 210; 340/995.1, 995.13, 995.23, 995.19
See application file for complete search history.

(56) References Cited

U.S. PATENT DOCUMENTS

| 5,406,490 A | 4/1995 | Braegas |
| 7,483,788 B2 * | 1/2009 | Tomita et al. ............... 701/210 |
| 2001/0004725 A1 | 6/2001 | Yagyu |

FOREIGN PATENT DOCUMENTS

| EP | 1 387 145 A1 | 2/2004 |
| FR | 2 772 498 A1 | 6/1999 |
| JP | A-09-178501 | 7/1997 |

* cited by examiner

*Primary Examiner*—Gertrude Arthur Jeanglaud
(74) *Attorney, Agent, or Firm*—Oliff & Berridge, PLC

(57) ABSTRACT

Navigation apparatuses, methods, and programs store path information for a path each time the path is traveled, the path being a segment of the guidance route from a branch point to a junction. The apparatuses, methods, and programs store detour route information for the detour route each time the detour route is traveled. The apparatuses, methods, and programs receive current traffic conditions from an external system and read out, when arriving at the branch point, path information having a same or similar stored traffic condition as a current path traffic condition and detour route information having a same or similar stored traffic condition as a current detour route traffic condition. The apparatuses, methods, and programs determine a difference between a required time for traveling along the path and a required time for traveling along the detour route and output guidance information based on the determined difference.

15 Claims, 5 Drawing Sheets

NAVIGATION APPARATUSES, METHODS, AND PROGRAMS

INCORPORATION BY REFERENCE

This application is a Continuation of U.S. patent application Ser. No. 11/176,250, filed Jul. 8, 2005 (now U.S. Pat. No. 7,483,788), which claims the benefit of Japanese Patent Application No. 2004-203746 filed Jul. 9, 2004. The disclosures of the prior applications including the specifications, drawings, and abstracts are hereby incorporated by reference herein in their entirety.

BACKGROUND

1. Related Technical Fields

Related technical fields include navigation apparatus.

2. Description of Related Art

Conventional navigation apparatuses display a route to a destination and provide timely guidance, thereby making vehicular travel easier. Thus, the use of such navigation apparatuses is increasing.

Conventional navigation apparatuses, such as, for example, described in Japanese Unexamined Patent Application Publication No. H9-178501, store a route taken in the past and uses the stored route information when searching a new route or a detour route. While traveling a route, the conventional navigation apparatuses may, for example, select a route taken in the past and set a destination based on the selected route.

SUMMARY

Such an aforementioned conventional navigation apparatus may receive traffic information from an external system, for example, a road traffic information communication system, indicating that a traveled guidance route is congested. Thus, the apparatus may search a detour route to avoid the congestion. The detour route diverges from the guidance route at a branch point before the congestion and merges into the original guidance route again after avoiding the congestion.

However, the searched detour route may not always be the best route to arrive at the destination. For example, when many vehicles choose the same detour route to avoid the congestion, the detour route may become congested. Thus, the detour route may take more time than expected to arrive at the destination.

Even if the conventional navigation apparatus selects a route which has been taken in the past as a detour route, the conventional apparatus is unaware of a traffic condition ahead on the detour route. Thus, the conventional apparatus is unable to determine the best detour route based on traffic congestion.

Accordingly, it is beneficial to provide a navigation apparatus that may determine the best detour route based on traffic congestion.

Accordingly, various exemplary implementations of the principles described herein provide navigation apparatuses, methods, and programs that are usable to store and use information about a detour route that diverges from a branch point on a guidance route and merges into the guidance route at a junction point. The apparatuses, methods, and programs store path information for a path each time the path is traveled, the path being a segment of the guidance route from the branch point to the junction, the path information including a first required time to travel the path, a traffic condition of the path at the time the path is traveled, and a traffic condition of the detour route at the time the path is traveled. The apparatuses, methods, and programs store detour route information for the detour route each time the detour route is traveled, the detour route information including a second required time to travel the detour route, a traffic condition of the path at the time the detour route is traveled, and a traffic condition of the detour route at the time the detour route is traveled. The apparatuses, methods, and programs receive current traffic conditions from an external system and read out, when arriving at the branch point, path information having a same or similar stored traffic condition as a current path traffic condition and detour route information having a same or similar stored traffic condition as a current detour route traffic condition. The apparatuses, methods, and programs determine a difference between the first required time for traveling along the path and the second required time for traveling along the detour route and output guidance information based on the determined difference.

BRIEF DESCRIPTION OF THE DRAWINGS

Exemplary implementations will now be described with reference to the accompanying drawings, wherein.

DETAILED DESCRIPTION OF EXEMPLARY IMPLEMENTATIONS

Figure 1:
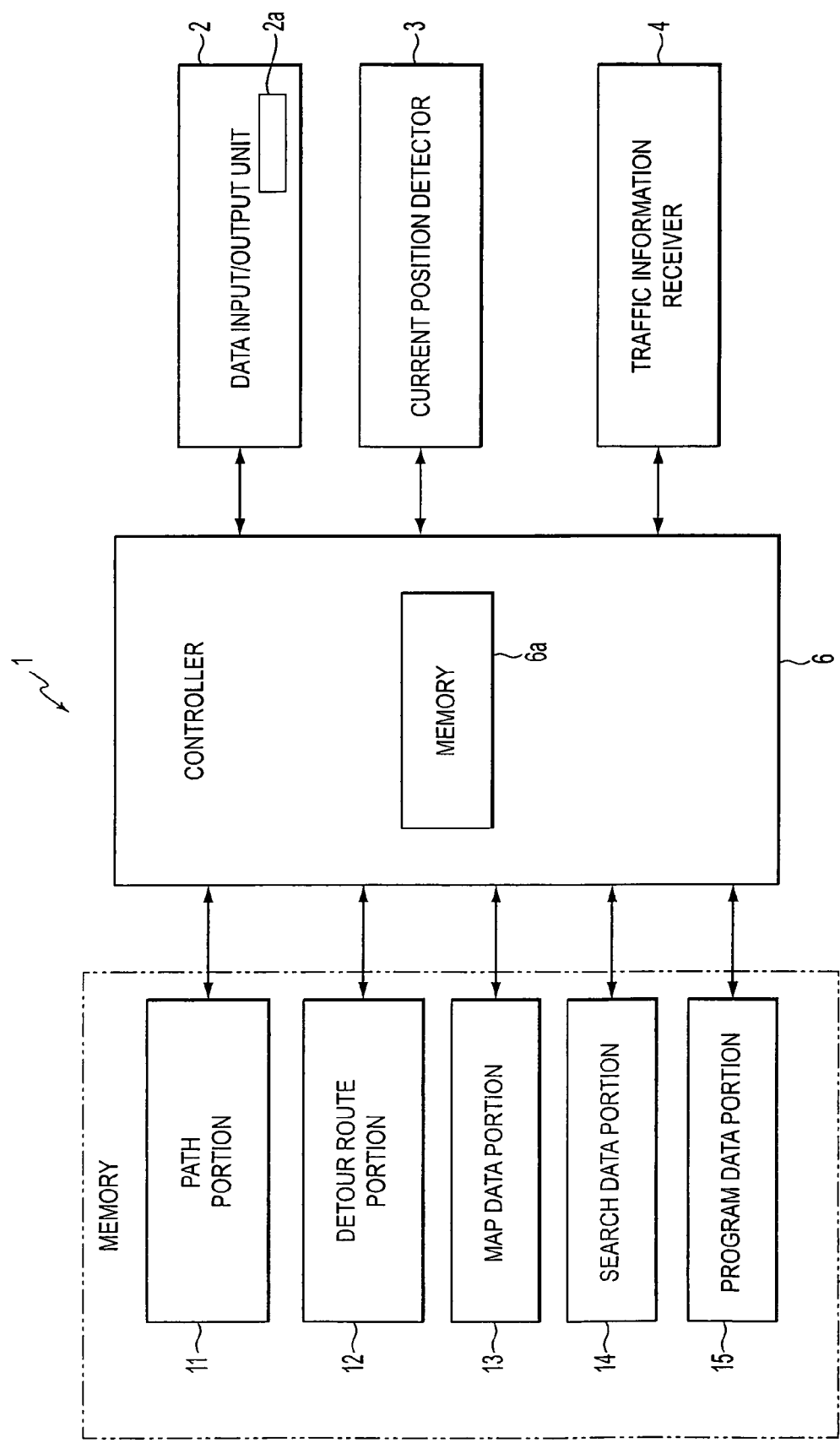
FIG. 1 is a block diagram showing a navigation apparatus according to an exemplary implementation of the principles described herein.

FIG. 1 shows a navigation apparatus 1, for example, installed in a vehicle. The navigation apparatus 1 may include a data input/output unit 2, a current position detector 3, a traffic information receiver 4, a memory 5, a controller 6, and am memory 6a. The controller 6 may be connected with the data input/output unit 2, the current position detector 3, the traffic information receiver 4, and/or the memory 5, and may controls the data input/output unit 2, the current position detector 3, the traffic information receiver 4, and/or the memory 5.

The data input/output unit 2 may include, for example, a various kinds of operation buttons. The data input/output unit 2 may output various kinds of operation signals to the controller 6 to perform route guidance. In addition, the data input/output unit 2 may include a display unit 2a. The display unit 2a may include, for example, a liquid crystal display and may display graphics to execute route guidance. The display unit 2a may include a display medium including a touch panel switch function. Various kinds of operation signals for route guidance may be output to the controller 6 by touching an operation switch on the screen.

The current position detector 3 may detect a current location of the vehicle in which the navigation apparatus 1 is installed. The current position detector 3 may include, for example, a GPS (Global Positioning System), a vehicle speed sensor, and a direction sensor, and output various kinds of signals to the controller 6 to calculate a current position of the vehicle.

The traffic information receiver 4 may include a receiving unit for receiving traffic information distributed from an external road traffic information communication system. The traffic information receiver 4 may output the received traffic information to the controller 6. The traffic information may include traffic condition information such as, for example, information about a degree of congestion. Such traffic information may be used to determine the traffic congestion on a link on a route. The traffic information receiver 4 may receive the traffic information and output it to the controller 6.

As used herein, the term "link" refers to, for example, a road or portion of a road. For example, according to one type of road data, each road may consist of a plurality of componential units called links. Each link may be separated and defined by, for example, an intersection, an intersection having more than three roads, a curve, and/or a point at which the road type changes.

The memory 5 may be physically, functionally, or conceptually divided into a path portion 11, a detour route portion 12, a map data portion 13, a search data portion 14, and/or a program data portion 15. The path portion 11 may store path information about a part of a route. The detour route portion 12 may store detour information about a part of a route. As used herein a "detour route" is a route that diverges from a guidance route set by a user at a branch point as a first point on the guidance route and merges into the guidance route at a junction as a second point on the guidance route.

Path information may include a required time (hereinafter referred to as a first required time) for traveling from the first point to the second point along the guidance route. The path information may include a traffic condition on the path when the vehicle travels on the path and a traffic condition on the detour route corresponding to the path. For example, the traffic condition may be "crowded," "congested," or "not-congested" obtained from the road traffic information communication system.

The detour route information may include a required time to travel a detour route (hereinafter referred to as a second required time). The detour route information may include the traffic condition on the detour route when the vehicle travels on the detour route and a traffic condition on the path corresponding to the detour route. Again, for example, the traffic condition may be "crowded," "congested," or "not-congested" obtained from the road traffic information communication system.

The map data portion 13 may store various kinds of data, such as, for example, destination data and map data. The various kids of data may be used for, for example, map display, route guidance, destination setting, address search, and/or telephone number search. The search data portion 14 may store, for example, road data and fixed vehicle speed data used, for example, for route searching.

The program data portion 15 may store various kinds of instructions and data for performing, for example, route search and route guidance. The program data portion 15 may store a program, for example, for creating and storing path information in the path portion 11 and detour route information in the detour route portion 12. The program data portion 15 may store a program for executing route guidance by using the path information and the detour route information.

The controller 6 may control various kinds of route guidance such as, for example, route searching, route detecting, route information creation, and route guidance, for example, based on instructions stored in the program data portion 15.

During route searching, for example, a current position may be found based on a detection signal from the current position detector 3. The current position may be displayed on a map, for example, on the display unit 2a based on the various kinds of data, such as, for example, map data stored in the map data portion 13. A destination, for example, input by a user operating the data input/output unit 2 may displayed on the map displayed in the display unit 2a.

During route detection, for example, a route connecting two points may be searched based on, for example, road data stored in the search data portion 14. The route may be detected by user operation of the data input/output unit 2 or automatically.

Route information may be created, for example, during traveling. For example, when the vehicle travels along a detour route, which diverges from the guidance route at a branch point and merges into the guidance route again at a junction, the detour route information may be created and stored in the detour route portion 12 upon the arrival at the junction. When the vehicle travels along a path from the branch point to the junction, the path information may be created and stored in the path portion 11 upon the arrival at the junction.

During route guidance, when traveling along the guidance route, a changing current position with time may displayed, for example, in the map on the screen. Further, the user may be given an audio guidance concerning the changing current position. During route guidance, when arriving at the branch point, guidance may be provided along the guidance route (the path) or guidance may be provided along the detour route, for example, based on the path information in the path portion 11 or the detour route information in the detour route portion 12.

Figure 2:
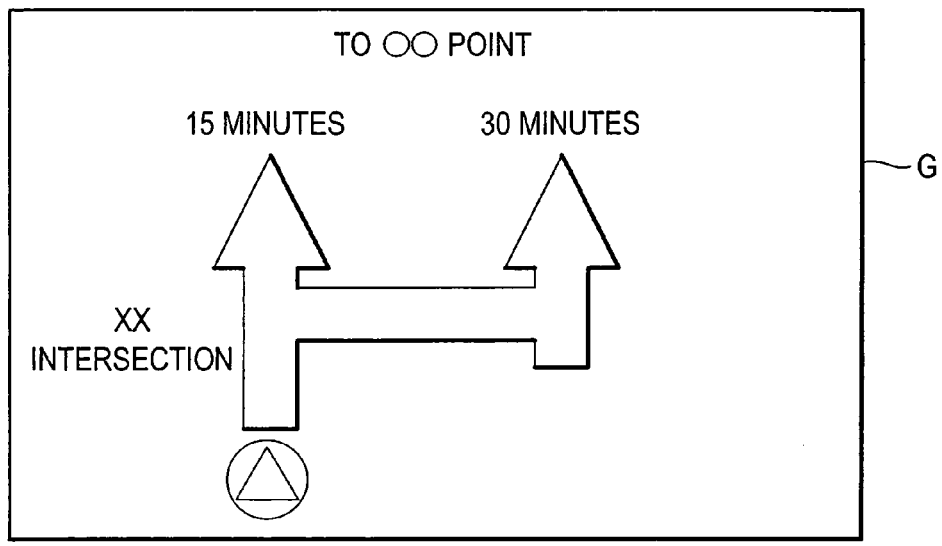
FIG. 2 shows a guidance screen according to an exemplary implementation of the principles described herein.

For example, a guidance screen G may be displayed on the display unit 2a as shown in FIG. 2 upon arrival at the branch point. If a detour route for the current guidance route (the current path) is searched at the branch point, each required time (e.g., a first required time for the path and a second required time for the detour route) to travel to the junction may be displayed on the guidance screen G.

Next, an exemplary method for creating path information and detour route information, will be described with reference to FIGS. 3 and 4. The exemplary method may be executed, for example, by the controller 6 of the above described navigation apparatus 1. However, it should be appreciated that the exemplary method need not be limited by the above structure. First, a processing for creating path information and detour route information and for storing the information, or example, in the path portion 11 and the detour route portion 12 will be described.

Figure 3:
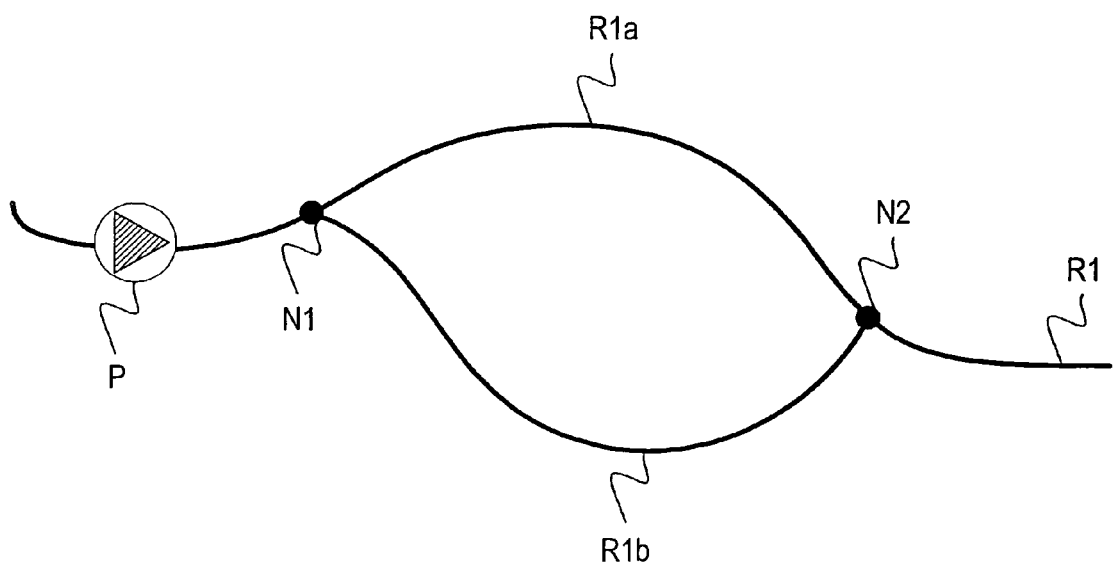
FIG. 3 shows a method of creating path information and detour route information according to an exemplary implementation of the principles described herein.

For the purpose of this example, as shown in FIG. 3, it is assumed that there is a vehicle traveling from a current position P to a destination along a guidance route R1. The guidance route R1 may be displayed, for example, on the display unit 2a of the navigation apparatus 1.

Figure 4:
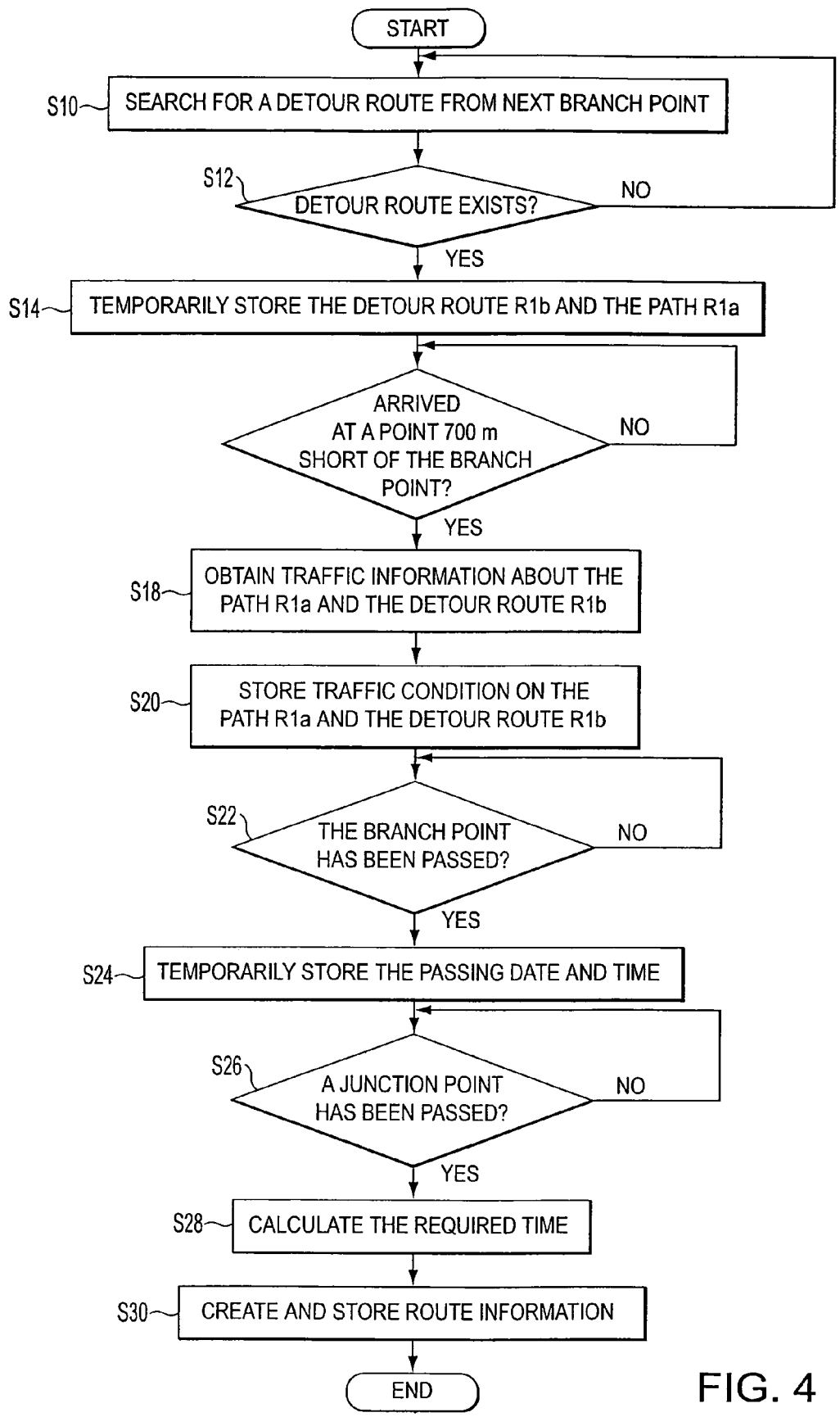
FIG. 4 shows a method of creating path information and detour route information according to an exemplary implementation of the principles described herein.

As shown in FIG. 4, first, a detour route that diverges from the guidance route R1 and merges into the R1 again is searched for from a next branch point N1 (Step S10). The search may be performed, for example, by the controller 6. The search may begin, for example, up to 700 meters before a branch point N1. If no detour route is found (Step S12=NO), the method returns to step S10 and a detour route is searched at a next branch point.

If a detour route that merges into the guidance route R1 is found (Step S12=YES), the detour route R1b and the path R1*a* may be temporarily stored (Step S14). For example, the controller 6 may temporarily store a part of the guidance route R1, from the branch point N1 to a junction N2 at which the detour route R1*b* merges into the guidance route R1, as a path R1*a* in the memory 6*a*.

Next, it is determined whether the current position is within 700 meters of the branch point N1 (Step S16). The determination may be made, for example, by the controller 6. If the current position is within 700 meters of the branch point N1 (Step S16=YES), traffic information is obtained for the path R1*a* and the detour route R1*b* (Step S18). The traffic information may be obtained, for example, from the road traffic information communication system via the traffic information receiver 4. Specifically, the controller 6 may obtain a traffic condition (crowded, congestion, or non-congestion) on the path R1*a* and traffic condition (crowded, congestion, or non-congestion) on the detour route R1*b* among accumulated traffic information.

Subsequently, the two traffic conditions on the path R1*a* and the detour route R1*b* are stored (Step S20), for example, by the controller 6 in the memory 6*a*. Next, it is determined whether the branch point N1 has been passed through (Step S22). This determination may be made, for example, by the controller 6. The vehicle may pass through the branch point N1, for example, by traveling along the path R1*a* or the detour route R1*b*. Therefore, when it is determined that the branch point N1 has been passed through (Step S22=YES), the date and time when the branch point N1 has been passed through are temporarily stored (Step S24), for example, in the memory 6*a* under control of the controller 6.

It is then determined whether a junction point N2 is passed (Step S26). For example, when the vehicle arrives at and further passes through the junction N2 (Step S26=YES), the junction passing time is stored (for example, in the memory 6*a*) and along with the route (e.g., the path R1*a* or the detour route R1*b*) that was traveled from the branch point N1 to the junction point N2. Next, the required time to travel the specified route is calculated and temporarily stored (Step S28), for example in the memory 6*a*. For example, if the path R1*a* was taken, a required time to travel along the path based on the passing time at the branch point N1 and the passing time at the junction point N2 is calculated. The required time for the path R1*a* may be referred to as a first required time. On the other hand, if the detour route R1*b* was taken, the required time is calculated based on the passing time at the branch point N1 and the passing time at the junction point N2. The required time for the detour R1*b* may be called a second required time.

After the first required time or the second required time is calculated, route information is created including the calculated required time, traffic conditions (for example, stored in the memory 6*a*), and the passing date and time (Step S30). For example, if the first required time for the path R1*a* is calculated, the controller 6 may create path information for the path R1*a* including the first required time, the passing date and time at the branch point N1, and both traffic conditions on the path R1*a* and the detour route R1*b* at the passing time. Then, the controller 6 may stores the created information in the path portion 11. Similarly, for example, if the second required time for the detour route R1*b* is calculated, the controller 6 may create detour route information for the detour route R1*b* including the second required time, the passing date and time at the branch point N1, and both traffic conditions on the path R1*a* and the detour route R1*b* at the passing time. Then, the controller 6 may store the created information in the detour route portion 12.

When the junction point N2 is passed through, a required time to travel a selected route, traffic condition on the traveled route, traffic condition on the other route which has not been traveled, and the passing date and time at the branch point N1 are stored as route information for the traveled route.

If the vehicle travels along the path R1*a*, the first required time, traffic conditions on both of the path R1*a* and the detour route R1*b*, and the passing date and time at the branch point N1 are stored as the path information in the path portion 11. If the vehicle travels along the detour route R1*b*, the second required time, traffic conditions on both of the path R1*a* and the detour route R1*b*, and the passing date and time at the branch point N1 are stored as the detour route information in the detour route portion 12.

Once either of the route information is created, the method is terminated and, for example, the method may be repeated to create next route information. For example, when arriving at the branch point N1 during traveling along the guidance route R1, the more times the path R1*a* and the detour route R1*b* are taken, the more number of path information and detour route information are stored in the path portion 11 and the detour route portion 12. Thus, path information and detour route information including a same or similar traffic condition to the traffic condition at the time may be obtained at the branch point N1 at any given time.

Next, another exemplary method of creating detour route information will be described with reference to FIG. 5. The exemplary method may be executed, for example, by the controller 6 of the above described navigation apparatus 1. However, it should be appreciated that the exemplary method need not be limited by the above structure.

In this method, a detour route is not searched in advance to create path information and detour route information. Rather, if a user selects a route that diverges from a guidance route and merges into the guidance route again, that route may be used to create the route information (the detour route information in this case). The exemplary method may be, for example, executed by operating an operation button of the data input/output unit 2 to change a mode, or may be executed automatically.

Again, as shown in FIG. 3, it is assumed that there is a vehicle traveling from a current position P to a destination along a guidance route R1. The current position P and guidance route R1 may be, for example, displayed on the display unit 2*a* of the navigation apparatus 1. First, it is determined whether the guidance (Step S40) has been terminated (Step S41). If guidance is terminated (Step S41=YES), for example, the vehicle has arrived at the destination, the method ends. Otherwise (Step S41=NO), it is determined whether the vehicle is traveling on a route that has diverged from the guidance route R1 while executing route guidance (Step S42).

If the taken route diverges from the guidance route R1 (Step S42=YES), received traffic information is stored (Step S44), for example, in the memory 6*a*, beginning at the diverging point (the branch point N1). For example, the controller 6 may store traffic information from the road traffic information communication system concerning all routes within a predetermined area of the center of the diverging point (the branch point N1) in the memory 6*a*. Then, the position of the diverging point (the branch point N1) and the passing time at the diverging point are stored (Step S46), for example, in the memory 6*a*.

Next it is determined whether the guidance (S48) has been terminated (Step 49). If guidance is terminated (Step S49=YES), the method ends. Otherwise (Step S49=NO), it is determined whether the route on which the vehicle is currently traveling has merged into the guidance route R1, again while executing route guidance (Step S50). When the traveling route merges into the guidance route R1 (Step S50=YES), the position of the merge point (unction point N2) and the passing time at the junction point N2 are stored (Step S52), for example, in the memory 6a.

Then, a path R1a from the branch point N1 to the junction point N2 on the guidance route R1 is specified based on the junction N2, and traffic information for the path R1a is determined. The determined traffic information is stored as the traffic condition of the path R1a (Step S54), for example, in the memory 6a. A detour route R1b that has been taken by the vehicle from the branch point N1 on the guidance route R1 to the junction point N2 is specified. The traffic condition of the detour route R1b is determined (for example, from all stored route traffic information in the memory 6a) and stored as the traffic condition of the detour route R1b (Step S54), for example, in the memory 6a.

The time required to travel the detour route R1b (second required time) is calculated based on the passing time at the branch point N1 and the passing time at the junction point N2 (Step S56). After the second required time is calculated, the detour route information, including the second required time and traffic conditions on both of the path R1a and the detour route R1b, are stored in the detour route portion 12 (Step S58) the method may be repeated to create next detour route information (Step S40).

Figure 5:
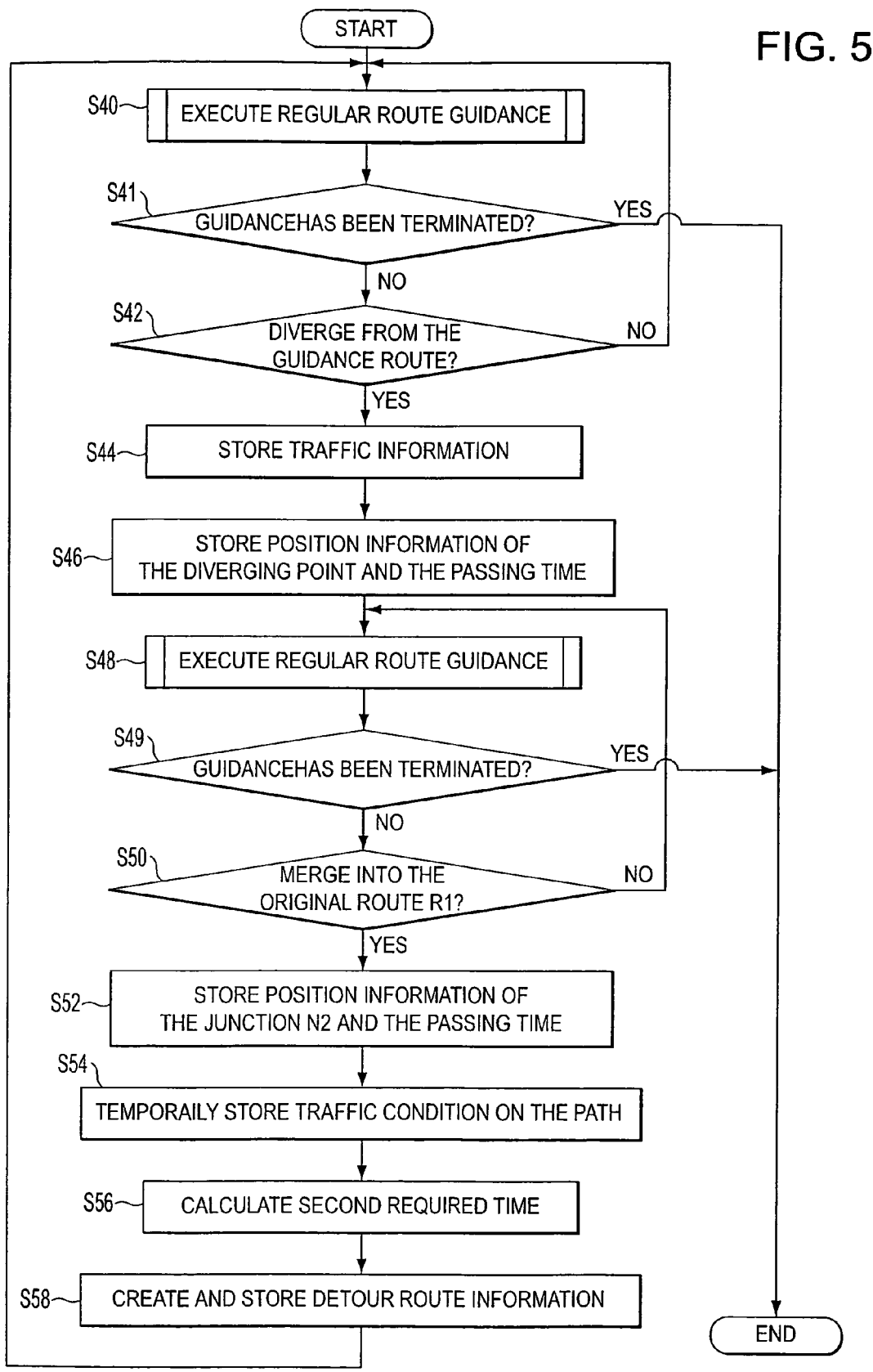
FIG. 5 shows a method of creating detour route information according to an exemplary implementation of the principles described herein.

According to the exemplary method shown in FIG. 5, although path information for the path R1a is not created, the user initiated detour route information for the detour route R1b may be created. Although, according to the exemplary method, a passing date is not stored, the passing date may be included in the detour route information.

Figure 6:
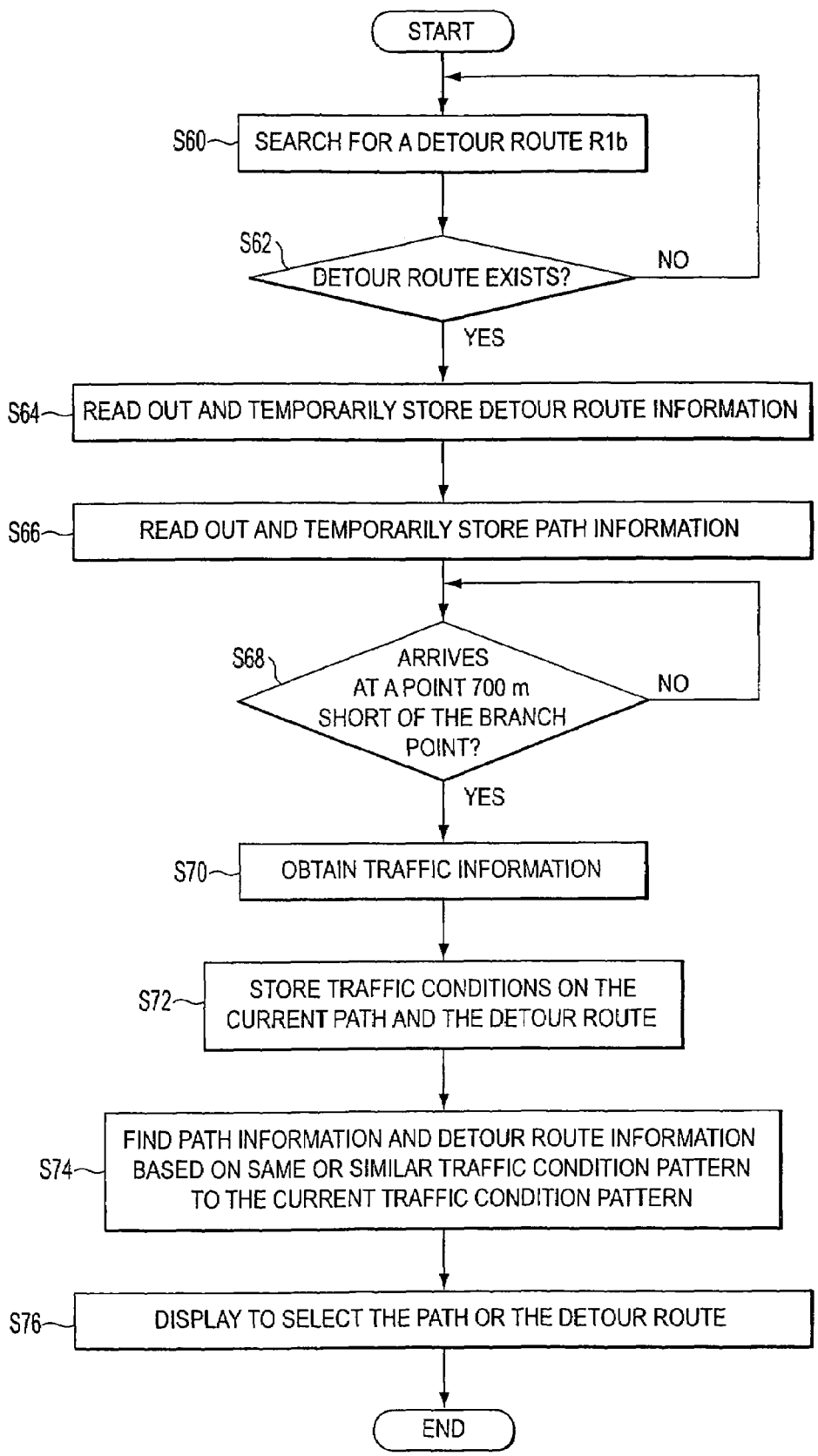
FIG. 6 shows route guidance method according to an exemplary implementation of the principles described herein.

Next, a route guidance, for example, based on path information for each path stored in the path portion 11 and detour route information for each detour route in the detour route portion 12, will be described with reference to FIG. 6. The exemplary method may be executed, for example, by the controller 6 of the above described navigation apparatus 1. However, it should be appreciated that the exemplary method need not be limited by the above structure.

Once again, it is assumed that there is a vehicle traveling from a current position P to a destination along a guidance route R1, for example, displayed on the display unit 2a of the navigation apparatus 1.

According to the exemplary navigation method, it is determined whether a detour route R1b that diverges from the guidance route R1 at a branch point N1 and merges into the guidance route R1 again exists before the vehicle arrives at a the branch point N1 (for example, 700 meters before the closest branch point) (Step S60). For example, detour route information for each detour route stored in the detour route portion 12 is searched to determine if such a route exists (Step S62). If there is no detour route R1b (Step S62=NO), the method returns to Step S60, and next detour route is searched at next branch point.

If at least one detour route R1b exists (Step S62=YES), the detour route information for the searched detour route(s) R1b is stored (Step S64), for example in memory 6a. Next path information for a path R1a corresponding to the searched detour route R1b from the path portion 11 is read out and temporarily stored (Step S66). It is assumed here that one or more than one path information of the path R1a corresponding to the detour route R1b are read out.

It is then determined whether the current position of the vehicle is within 700 meters of the branch point N1 (Step S68). If the vehicle is within 700 meters of the branch point N1 (Step S68=YES), traffic information is obtained (Step S70), for example, from the road traffic information communication system via the traffic information receiver 4. Specifically, for example, the controller 6 may obtain a traffic condition on the path R1a and a traffic condition on the detour route R1b from the stored traffic information.

Path information corresponding to the path R1a and detour route information corresponding to the detour route R1b is read out having same or similar traffic condition pattern to the obtained current traffic condition on the path R1a and the obtained current traffic condition on the detour route R1b, form among the various stored path information and detour route information (Step S74).

In this example, a same pattern or a similar pattern is intended to encompass at least following. For example, when a current traffic condition on the path R1a is "crowded" and a current traffic condition on the detour route R1b is "congested," a stored traffic condition on the path R1a that is "crowded" and a stored traffic condition on the detour route R1b that is "congested" may be considered similar patterns. According to detour route information, a stored traffic condition on the path R1a that is "congested" and a stored traffic condition on the detour route R1b that is "congested" may be considered similar as well. Thus, the current traffic condition and stored traffic condition need not be identical. An acceptable degree of similarity may be determined in advance.

In this example, according to the path information, the traffic condition pattern on the current path R1a is the same as the traffic condition pattern on the detour route R1b. On the other hand, according to the detour route information, the traffic condition pattern on the current path R1a is a similar pattern to the traffic condition pattern on the detour route R1b.

Next, based on the read path information and the read detour route information, a picture may be displayed to the user, for example, on the display unit 2a to prompt the user to select either of the path R1a or the detour route R1b to arrive at the junction point N2 (Step S76).

FIG. 2 shows an example of a guidance screen G that may be displayed on the display unit 2a. The guidance screen G may show each required time, (the first required time to travel the path R1a from the branch point N1 to the junction point N2 and the second required time to travel the detour route R1b from the branch point N1 to the junction point N2). The user may select either of the path or the detour route to travel based on the guidance screen G.

The first required time in the path information based on a same or similar traffic condition pattern to the current traffic condition on the path and the second required time in the detour route information based on a same or similar traffic condition pattern to the current traffic condition on the detour route (for example, determined in Step S74) may be displayed as the required times for the route R1a and for the route R1b. Thus, accurate required times may be displayed and suitable route guidance may be executed.

The aforementioned exemplary implementations of the principles described herein may be considered advantageous in at least the following respects.

According to the exemplary implementations, when a vehicle arrives at a branch point, the controller 6 may out a required time (first required time) that has been taken to travel a path R1a in the past on the basis of same or similar traffic condition patterns to the current traffic condition patterns of the path R1a and a detour route R1b, from the path portion 11. In addition, the controller 6 may read out a required time (second required time) that has been taken to travel the detour route R1b in the past on the basis of same or similar traffic condition patterns to the current traffic condition patterns of the path R1a and the detour route R1b, from the path information storage unit 12.

Even if when traffic condition patterns on the path R1a and the detour route R1b change while the route R1 is being traveled, the first required time and the second required time are determined on the basis of same or similar traffic condition patterns are displayed on the display unit 2a by the controller 6. Thus, the user may know which route should be selected to get a junction point first with a high degree of accuracy and a most suitable route guidance may be executed.

The controller 6 may create and store path information once the vehicle travels along the path R1a. Similarly, the controller 6 may create and store detour route information once the vehicle travels along the detour route R1b. Therefore, a large amount of information may be stored easily and accurate route guidance may be executed.

Even if the user selects a route that diverges from the guidance route R1 at the branch point N1 and merges into the route at the junction N2 again, on his/her own will, the controller 6 may creates and stores the timely detour route information once the vehicle travels along the detour route R1b. Thus, a large amount of information may be stored easily and accurate route guidance may be executed.

The traffic information receiver 4 may receive traffic conditions on both of the path R1a and the detour route R1b from the road traffic information communication system. Thus, accurate traffic information may be obtained with simple operation.

Note that, various other exemplary implementations may differ from the above described exemplary implementations in at leas the following respects.

In the aforementioned exemplary implementations, traffic condition patterns may include three types of traffic conditions, including "crowded," "congested," and "not congested." However, various other information including, for example, time zone, date, season, or weather may be added as traffic conditions. Thus, more accurate information may be obtained and accurate route guidance may be executed.

In the aforementioned exemplary implementations, for ease of explanation, two routes, a path and a detour route, are described. However, the principles of the exemplary methods equally apply if two or more routes connecting a first point and a second point exist.

In the aforementioned exemplary implementation, current traffic conditions are obtained just before arriving at a branch point and guidance of either of a path or a detour route is operated based on the obtained traffic condition. However, it is possible to obtain traffic conditions at any point before the branch point as traffic conditions on the path and the detour route. Thus, at the point much before the branch point, the user may know existence of detour routes and may select one route by a displayed guidance, well before reaching the branch point, such as for example, when beginning a trip.

In the aforementioned exemplary implementation, when the vehicle arrives at the branch point N1, a required time to travel the path R1a and the required time to travel the detour route R1b are displayed on the guidance screen G in FIG. 2. However, only the shorter required time may be displayed on the display unit 2a. In addition, instead of such required time, a difference between the required time (first required time) for the path R1a and the required time (second required time) for the detour route R1b may be found and displayed on the display unit 2a, or even displayed with voice guidance. For example, a guidance about the time difference, such as, "This route requires 10 minutes less," may be provided.

In the aforementioned exemplary implementation, the required time for the path R1a and the required time for the detour route R1b are displayed on the guidance screen G. However, the path R1a and the detour route R1b may be displayed on the map together with the guidance route R1, the first required time, and the second required time. In this case, the path R1a and the detour route R1b may be indicated, for example, by different colors from other routes or by blinking lines.

In the aforementioned exemplary implementation, the first required time and the second required time are displayed. However, current traffic condition, the date of collecting the first required time and the second required time (that is, the date of traveling by the vehicle in the past), and the traffic condition at that time may be displayed as well. Such information may make the user more comfortable in selecting a most suitable route because the user may have more information for making a decision.

While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A navigation apparatus for storing and using information about a detour route that diverges from a branch point on a guidance route and merges into the guidance route at a junction point, comprising:

a memory that:
  stores path information for a path each time the path is traveled, the path being a segment of the guidance route from the branch point to the junction point, the path information including a first required time to travel the path, a traffic condition of the path at the time the path is traveled, and a traffic condition of the detour route at the time the path is traveled; and
  stores detour route information for the detour route each time the detour route is traveled, the detour route information including a second required time to travel the detour route, a traffic condition of the path at the time the detour route is traveled, and a traffic condition of the detour route at the time the detour route is traveled; and;

a controller that:
  receives current traffic conditions from an external system;
  reads out, when arriving at the branch point, path information having a same or similar stored traffic condition as a current path traffic condition and detour route information having a same or similar stored traffic condition as a current detour route traffic condition;
  determines a difference between the first required time for traveling along the path and the second required time for traveling along the detour route; and
  outputs guidance information based on the determined difference.

2. The navigation apparatus of claim 1, wherein the controller:
  calculates the first required time to travel the path;
  determines the current traffic condition of the path, and the current traffic condition of the detour route based on the current traffic conditions received from the external system;
  creates the path information;
  stores the created path information a memory;
  calculates the second required time to travel the detour route;
  creates the detour route information; and
  stores the created detour route information in the memory.

3. The navigation apparatus of claim 1, wherein the controller:
  determines, at the branch point, whether the guidance route is being traveled;
  stores, if it is determined at the branch point the guidance route is no longer being traveled, the received current traffic information;
  determines, at the junction point, whether the guidance route is being traveled;
  obtains, if it is determined at the branch point the guidance route is no longer being traveled and it is determined at the junction point that the guidance route is being traveled, the current traffic condition of the detour route and the current traffic condition of the path based on the received traffic conditions;
  creates the detour route information, the detour route information including the obtained current traffic condition of the detour route, the obtained current traffic condition of the path, and the second required time to travel the detour route; and
  stores the detour route information.

4. The navigation apparatus of claim 1, wherein the path information is stored every time the path is traveled.

5. The navigation apparatus of claim 1, wherein the detour route information is stored every time the detour route is traveled.

6. A navigation method for storing and using information about a detour route that diverges from a branch point on a guidance route and merges into the guidance route at a junction point, comprising:
  storing path information for a path each time the path is traveled, the path being a segment of the guidance route from the branch point to the junction, the path information including a first required time to travel the path, a traffic condition of the path at the time the path is traveled, and a traffic condition of the detour route at the time the path is traveled;
  storing detour route information for the detour route each time the detour route is traveled, the detour route information including a second required time to travel the detour route, a traffic condition of the path at the time the detour route is traveled, and a traffic condition of the detour route at the time the detour route is traveled;
  receiving current traffic conditions from an external system;
  reading out, when arriving at the branch point, path information having a same or similar stored traffic condition as a current path traffic condition and detour route information having a same or similar stored traffic condition as a current detour route traffic condition;
  determining a difference between the first required time for traveling along the path and the second required time for traveling along the detour route; and
  outputting guidance information based on the determined difference.

7. The navigation method of claim 6, further comprising:
  calculating the first required time to travel the path;
  determining the current traffic condition of the path, and the current traffic condition of the detour route based on the current traffic conditions received from the external system;
  creating the path information;
  storing the created path information a memory;
  calculating the second required time to travel the detour route;
  creating the detour route information; and
  storing the created detour route information in the memory.

8. The navigation method of claim 6, further comprising:
  determining, at the branch point, whether the guidance route is being traveled;
  storing, if it is determined at the branch point the guidance route is no longer being traveled, the received current traffic information;
  determining, at the junction point, whether the guidance route is being traveled;
  obtaining, if it is determined at the branch point the guidance route is no longer being traveled and it is determined at the junction point that the guidance route is being traveled, the current traffic condition of the detour route and the current traffic condition of the path based on the received traffic conditions;
  creating the detour route information, the detour route information including the obtained current traffic condition of the detour route, the obtained current traffic condition of the path, and the second required time to travel the detour route; and
  storing the detour route information.

9. The navigation method of claim 6, further comprising storing the path information every time the path is traveled.

10. The navigation method of claim 6, further comprising storing the detour route information every time the detour route is traveled.

11. A computer-readable storage medium storing a set of program instructions executable on a data processing device and usable to store and use information about a detour route that diverges from a branch point on a guidance route and merges into the guidance route at a junction point, the program comprising:
  instructions for storing path information for a path each time the path is traveled, the path being a segment of the guidance route from the branch point to the junction, the path information including a first required time to travel the path, a traffic condition of the path at the time the path is traveled, and a traffic condition of the detour route at the time the path is traveled;
  instructions for storing detour route information for the detour route each time the detour route is traveled, the detour route information including a second required time to travel the detour route, a traffic condition of the path at the time the detour route is traveled, and a traffic condition of the detour route at the time the detour route is traveled;
  instructions for receiving current traffic conditions from an external system;
  instructions for reading out, when arriving at the branch point, path information having a same or similar stored traffic condition as a current path traffic condition and detour route information having a same or similar stored traffic condition as a current detour route traffic condition;
  instructions for determining a difference between the first required time for traveling along the path and the second required time for traveling along the detour route; and
  instructions for outputting guidance information based on the determined difference.

12. The computer-readable storage medium of claim 11, wherein the program further comprises:
  instructions for calculating the first required time to travel the path;
  instructions for determining the current traffic condition of the path, and the current traffic condition of the detour route based on the current traffic conditions received from the external system;
  instructions for creating the path information;

instructions for storing the created path information a memory;

instructions for calculating the second required time to travel the detour route;

instructions for creating the detour route information; and instructions for storing the created detour route information in the memory.

13. The computer-readable storage medium of claim 11, wherein the program further comprises:

instructions for determining, at the branch point, whether the guidance route is being traveled;

instructions for storing, if it is determined at the branch point the guidance route is no longer being traveled, the received current traffic information;

instructions for determining, at the junction point, whether the guidance route is being traveled;

instructions for obtaining, if it is determined at the branch point the guidance route is no longer being traveled and it is determined at the junction point that the guidance route is being traveled, the current traffic condition of the detour route and the current traffic condition of the path based on the received traffic conditions;

instructions for creating the detour route information, the detour route information including the obtained current traffic condition of the detour route, the obtained current traffic condition of the path, and the second required time to travel the detour route; and storing the detour route information.

14. The computer-readable storage medium of claim 11, wherein the program further comprises instructions for storing the path information every time the path is traveled.

15. The computer-readable storage medium of claim 11, wherein the program further comprises instructions for storing the detour route information every time the detour route is traveled.

* * * * *